(12) United States Patent
Lee et al.

(10) Patent No.: US 8,508,507 B2
(45) Date of Patent: Aug. 13, 2013

(54) INPUT DETECTION SYSTEMS AND METHODS FOR DISPLAY PANELS WITH EMBEDDED PHOTO SENSORS

(75) Inventors: Chun-Yuan Lee, Pingtung County (TW); Shen-Tai Liaw, Hsinchu (TW)

(73) Assignee: Integrated Digital Technologies, Inc., Hsinchu Science Park (TW)

( * ) Notice: Subject to any disclaimer, the term of this patent is extended or adjusted under 35 U.S.C. 154(b) by 703 days.

(21) Appl. No.: 12/420,147

(22) Filed: Apr. 8, 2009

(65) Prior Publication Data

US 2010/0259487 A1    Oct. 14, 2010

(51) Int. Cl.
*G06F 3/042* (2006.01)
*G09G 5/00* (2006.01)

(52) U.S. Cl.
USPC .............. 345/175; 345/173; 345/156; 434/20

(58) Field of Classification Search
None
See application file for complete search history.

(56) References Cited

U.S. PATENT DOCUMENTS

| | | | |
|---|---|---|---|
| 2004/0012565 A1* | 1/2004 | Cok | 345/158 |
| 2007/0077539 A1* | 4/2007 | Tzidon et al. | 434/21 |
| 2010/0273130 A1* | 10/2010 | Chai et al. | 434/20 |

FOREIGN PATENT DOCUMENTS

| | | |
|---|---|---|
| JP | 9231006 | 9/1997 |
| JP | 2005-185740 A | 7/2005 |
| JP | 2006031549 | 2/2006 |
| JP | 2008097172 | 4/2008 |
| JP | 2009-45112 A | 3/2009 |
| TW | 591504 | 6/2004 |
| WO | WO 2005/114369 | 12/2005 |

* cited by examiner

*Primary Examiner* — Andrew L Sniezek
(74) *Attorney, Agent, or Firm* — Finnegan, Henderson, Farabow, Garrett & Dunner, LLP

(57) ABSTRACT

A method of for identifying multiple optical inputs to a display area with embedded photo sensors includes providing a display area with embedded photo sensors configured to display visual information; receiving a first and a second input optically transmitted to a first and a second location on the display area, respectively; processing the first and second inputs to identify at least one of (1) the location of the first and second inputs relative to the display area; and (2) a timing of the first and second inputs; and determining whether the first and second inputs originated from a single source or multiple sources based on at least their (1) wavelengths; (2) flash or pulse frequencies; (3) durations; (4) timings; (5) intensities; (6) modulation schemes; (7) projected input patterns; and (8) at least one estimated trace of the inputs; and providing first and second input information containing at least (1) their locations and (2) their timings.

27 Claims, 5 Drawing Sheets

INPUT DETECTION SYSTEMS AND METHODS FOR DISPLAY PANELS WITH EMBEDDED PHOTO SENSORS

TECHNICAL FIELD

Systems and methods disclosed herein relate to display panels with embedded photo sensors, and more specifically, to display panels with embedded photo sensors that detect and track inputs from multiple sources.

BACKGROUND INFORMATION

Many digital data display systems benefit from having an interactive display for the user to communicate with the associated computer system. These systems include video game systems, cellular phones, televisions, personal digital assistants, computers, laptops, servers, ATMs, and digital picture frames.

With the advance of technology, numerous methods of achieving interactive displays become possible. Touch-screen devices may operate to recognize and track user input. One example of a touch-screen device include a device having a substrate and a flexible film that are brought into contact or change its capacitive effect when a user touches the screen. The variation in resistances or capacitances at different locations may be detected to determine the location of the user input. Alternatively, optical touch screens may be used to detect a user input by shadow effect or other optical effect created or caused by an input object. Another technique used in interactive displays may involve the detection of surface acoustic waves travelling across a surface of detecting an input.

However, in many instances of input-detection methods, an input detection usually does not distinguish among inputs originated from different sources or designed to represent different sources. That is, many input-detection methods do not account for the possibility that multiple inputs originated from different sources, and do not identify and track inputs that originated from the same source when multiple sources are providing inputs.

Accordingly, there exists a need to recognize and track inputs from multiple sources.

SUMMARY

In accordance with the invention, there is provided a method for identifying multiple optical inputs to a display area with embedded photo sensors, the method comprising providing a display area with embedded photo sensors configured to display visual information; receiving a first input optically transmitted to a first location on the display area; receiving a second input optically transmitted to a second location on the display area; processing the first and second inputs to identify at least one of (1) the location of the first and second inputs relative to the display area; and (2) a timing of the first and second inputs; and determining whether the first and second inputs originated from a single source or multiple sources based on at least one of (1) the wavelengths of the first and second inputs; (2) the flash or pulse frequencies of the first and second inputs; (3) the durations of the first and second inputs; (4) the timings of the first and second inputs; (5) the intensities of the first and second inputs; (6) the modulation schemes associated with the first and second inputs; (7) projected input patterns of the first and second inputs; and (8) at least one estimated trace of at least one of the first and second inputs; and providing first input information and second input information each containing at least one of (1) the location of the respective input relative to the display area; and (2) the timing of the respective input.

Also in accordance with the invention, there is provided a system for identifying multiple optical inputs to a display area with embedded photo sensors, the system comprising a display area with embedded photo sensors configured to display visual information; an input-detection unit for receiving a first and a second input optically transmitted to a first and a second location, respectively, on the display area; and a processor, wherein the processor identifies at least one of (1) the location of the first and second inputs relative to the display area; and (2) a timing of the first and second inputs; determines whether the first and second inputs originated from a single source or multiple sources based on at least one of (1) the wavelengths of the first and second inputs; (2) the flash or pulse frequencies of the first and second inputs; (3) the durations of the first and second inputs; (4) the timings of the first and second inputs; (5) the intensities of the first and second inputs; (6) the modulation schemes associated with the first and second inputs; (7) projected input patterns of the first and second inputs; and (8) at least one estimated trace of at least one of the first and second inputs; and provides first input information and second input information each containing at least one of (1) the location of the respective input relative to the display area; and (2) the timing of the respective input.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate various embodiments. In the drawings.

DESCRIPTION OF THE EMBODIMENTS

The following descriptions, for purposes of explanation and without limiting the scope of the invention, provide exemplary techniques and embodiments consistent with the invention. Certain sequences of steps, interfaces, and configurations may be illustrated to provide understanding of the techniques presented herein. While the techniques and embodiments will primarily be described in context with the accompanying drawings, those skilled in the art will further appreciate that the techniques and embodiments can also be practiced in other display systems or can be modified depending on system design or applicants.

Reference will now be made in detail to exemplary embodiments of the invention, examples of which are illustrated in the accompanying drawings. Wherever possible, the same reference numbers are used throughout the drawings to refer to the same or like parts.

Figure 1:
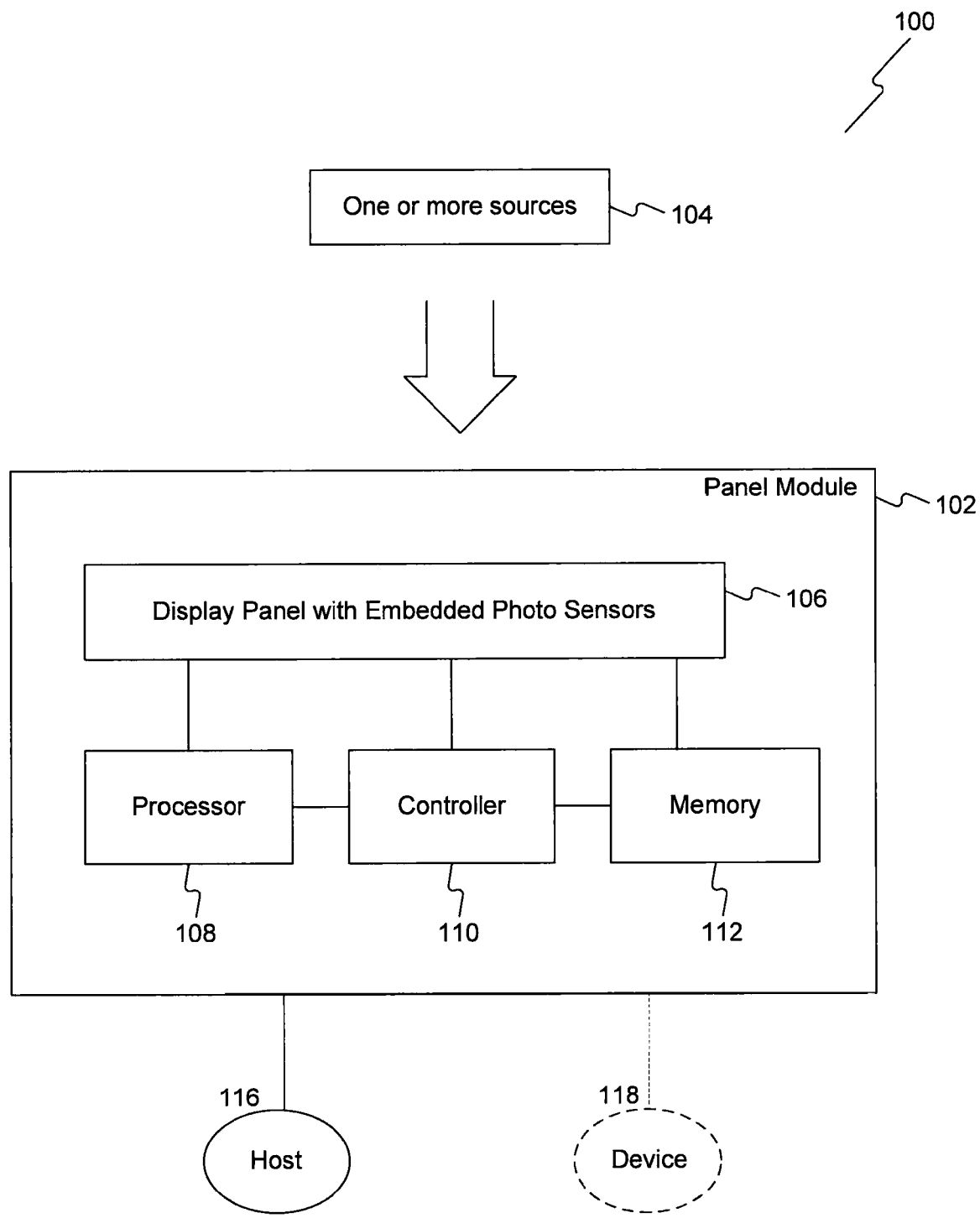
FIG. 1 shows an exemplary panel module, consistent with certain disclosed embodiments.

FIG. 1 is a block diagram 100 illustrating a panel module 102, consistent with certain disclosed embodiments. Panel module 102 may receive one or more inputs from one or more sources 104 and may include a display panel 106, a processor 108, a controller 110, and a memory 112. Display panel 106, processor 108, controller 110, and memory 112 are interconnected within panel module 102. Alternatively, they may be connected according to specific desired configurations. As an example, display panel 106 may be coupled with processor 108, which may be coupled with controller 110 and memory 112. One of ordinary skilled the art would recognize that panel module 102 may include other components not shown in FIG. 1, such as input or output interfaces, audio input and output components, etc.

Panel module 102 may be a stand-alone interactive display device, or more preferably, is a display panel with embedded photo sensors compatible with, attached to, or formed as a component of host 116 and an optional device 118. Examples of host 116 and optional device 118, or an overall system containing panel module 102 include video game systems, televisions, personal digital assistants, computers, laptops, servers, ATMs, digital picture frames, or cellular phones. Other than being a display component of a system, panel module 102 alternatively may be a device for displaying still image.

Input devices, such as one or more sources 104 illustrated in FIG. 1, may provide inputs to panel module 102, such as optically or in the form of energy beams. Energy beams may include beams in the form of infrared, laser, invisible, or visible light. In some embodiments, one or more sources 104 may include inputs from one or more users operating a stylus or other pointing device, a video game controller, or any other objects used as a controller or may include more users' touch of a finger or any other body parts.

Display panel 106 includes embedded photo sensors capable of detecting various characteristics of the inputs provided by one or more sources 104, including their locations and timings. Other characteristics of the inputs that may be detected by display panel 106 include wavelength, pulse frequency, durations, timing, intensity, modulation scheme, input patterns, temperature, size. For example, modulation schemes may include any of analogue or digital modulation methods such as amplitude modulation, phase modulation, and frequency-shift keying. As another example, input patterns may include different shapes that constitute areas of input, such as a square, a circle, a triangle, or a line.

Display panel 106 may be adapted to display information in the form of static images, video images, text, or any other type of graphics. The information displayed by display panel 106 may be used to inform a user of the system and/or form part of a user interface. The user may interact with the user interface to instruct the system to perform certain functions or tasks. The display panel 106 may be a liquid crystal display ("LCD") screen. Those skilled in the art will appreciate, however, that any type of display screen may be used in conjunction with the disclosed embodiments. For example, other types of display screens may be used, such as light-emitting-diode (LED)-based display, organic light-emitting diode/display ("OLED"), cathode ray technology, other thin film transistor ("TFT") displays, plasma display panels ("PDP"), electroluminescence display, etc.

Processor 108 may receive and process inputs received by display panel 106 and determines the one or more respective sources of the one or more inputs detected by display panel 106. As an example, processor 108 may be a pre-configured logic or circuitry or a programmable logic device, such as a microprocessor.

Controller 110 may perform one or more control tasks including controlling numerous components within panel module 102. For example, controller 110 may adjust various parameters of display panel 106 including display, power, input detection sensitivity, and output. Controller 110 may also control parameters of one or more sources 104. In one embodiment, controller 110 may vary the information displayed by display panel 106 in response to user inputs. Additionally, controller 110 may control host 116 and/or optional device 118 connected to or incorporating panel module 102.

Memory 112 may include any or all forms of non-volatile or volatile memory. In various embodiments, different memory devices may be used, including, by way of example, semiconductor memory devices, such as EPROM, RAM, ROM, DRAM, EEPROM, and flash memory devices; magnetic disks such as internal hard disks and removable disks; magneto-optical disks; and CD-ROM disks. In some embodiments, memory 112 may store or provide data used by panel module 102 in detecting or processing inputs and may store data used by processor 108 or controller 110. Memory 112 may also include computer-readable storage medium including application programs, code, and/or instructions that may be executed on processor 108 during performance of various processing tasks performed. Additionally, memory 112 may store data from host 116 and device 118, and/or provide data to host 116 and device 118.

Figure 2:
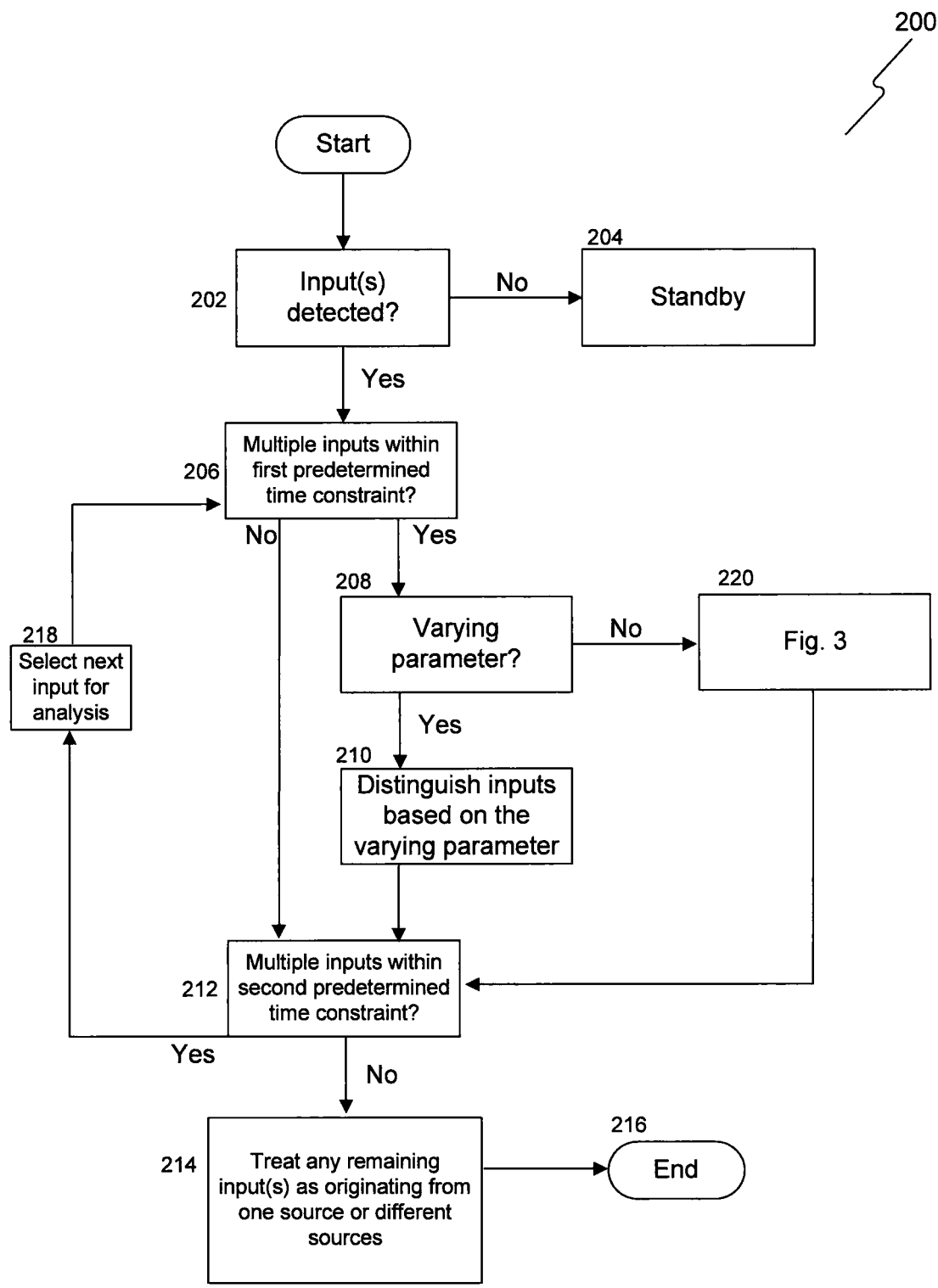
FIG. 2 shows a process of input analysis, consistent with certain disclosed embodiments.

Processor 108 may process inputs to identify multiple inputs. FIG. 2 illustrates an exemplary process 200 consistent with certain disclosed embodiments. In this embodiment, processor 108 may process inputs, either based on the input signals to identify the input location or based on the received signals containing location information from display panel 106.

At step 202, processor 108 may determine whether or not display panel 106 has detected input(s). If display panel 106 has not detected any inputs, processor 108 may remain on standby (step 204) and may continue to monitor or receive later inputs. If display panel 106 has detected either one or multiple inputs, processor 108 may then determine, at step 206, whether the one or multiple inputs were received within a certain time period, such as a first predetermined time constraint. In one embodiment, the time period may be a small fraction of a second during which inputs may be received. Multiple inputs received within the time period may be deemed to have been received simultaneously. If only one input was received during the time period, processor 108 may conclude no simultaneous inputs were received.

If processor 108 determines that display panel 102 has detected inputs within the time period, i.e., simultaneous inputs, processor 108 then analyzes the inputs to determine if a varying parameter exists between the inputs (step 208). The varying parameter is a parameter that may distinguish one input from another, and may be in the form of wavelength, flash or pulse frequency, durations, timing, intensity, modulation scheme, input patterns, temperature, size, or optical signal modulations of each input. For example, in an interactive target practice game, two users may each provide inputs directed at display panel 106 using game controllers resembling rifles that provide inputs at different flash or pulse frequencies, processor 108 would consider the differing flash or pulse frequencies a varying parameter that distinguishes one user's inputs from another's. As another example, two users who are both drawing circles on the same display using their fingers may provide inputs that differ in intensity, temperature, and/or size. Processor 108 would analyze these differences between the inputs and select one or a combination of the differing intensity, temperature, and size as the varying parameter.

Once processor 108 analyzes the differences between inputs and determines that there exists a varying parameter which distinguishes between input(s) from one source and input(s) from another source, it performs a first analysis to distinguish the inputs from one another based on the varying parameter (step 210). In the example provided above involving an interactive target practice game, processor 108 may conclude, based on the difference in flash or pulse frequencies in the inputs, that input A and input B each belongs to a different source.

On the other hand, processor 108 may conclude that there is no varying parameter between the inputs. Processor 108 may conclude this when, for example, the inputs' parameters are identical, or if any differences in parameters between the inputs are inconsistent or insubstantial, and do not qualify as a varying parameter. When processor 108 concludes that there is no varying parameter between the inputs, it performs a second analysis at step 220 in order to distinguish the inputs from one another. The second analysis will be described in association with FIG. 3.

Figure 3:
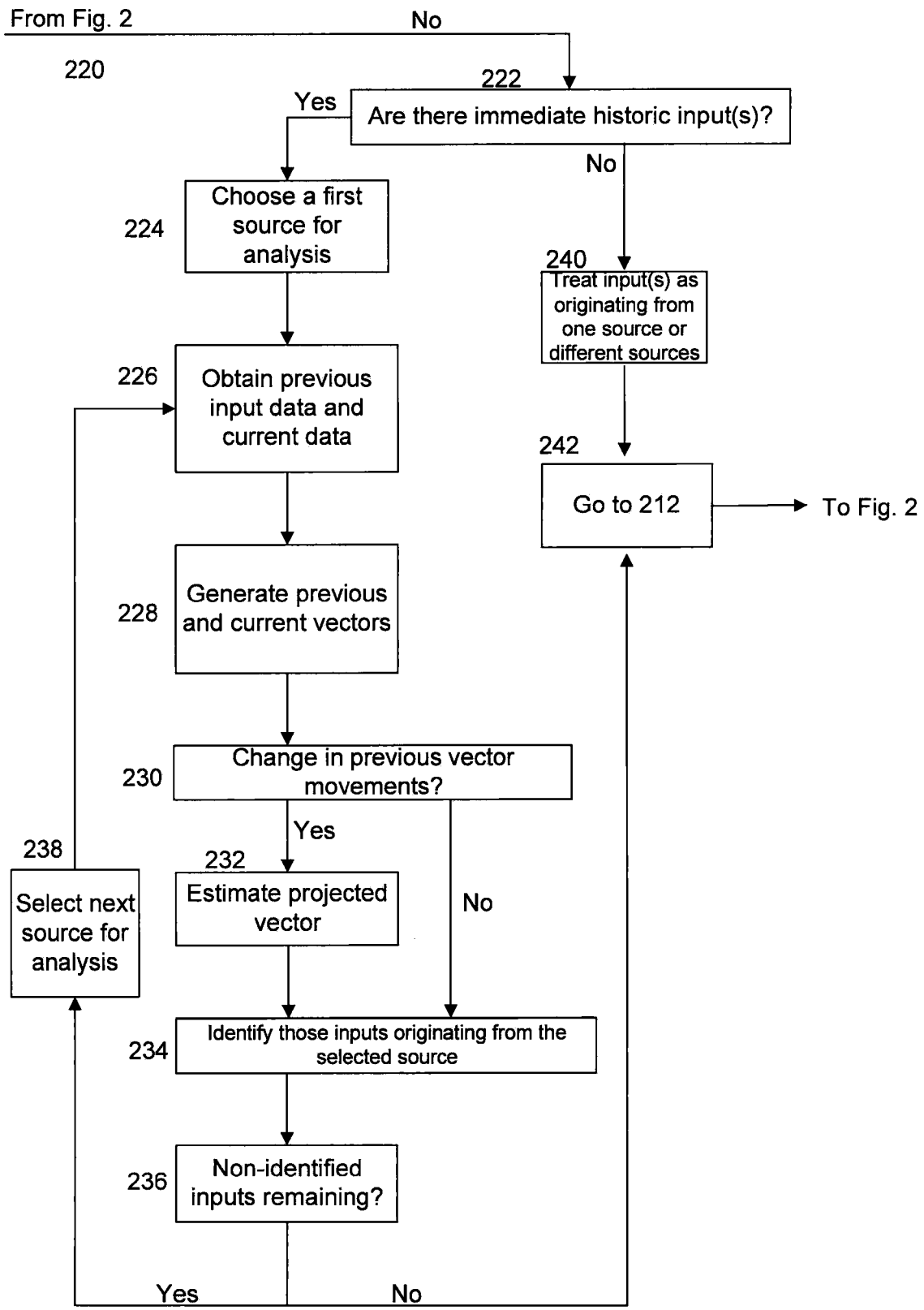
FIG. 3 shows a portion of the input analysis process illustrated in FIG. 2.

In FIG. 3, processor 108 analyzes those inputs which were determined, in 208, to have no varying parameter that can distinguish between inputs from source and inputs from other sources. At step 222, processor 108 may check memory 112 for any immediate historic input(s). Immediate historic inputs are those inputs received by display panel 106 immediately prior to the inputs currently being analyzed by processor 108. For example, if a user is tracing a curve on the display panel 106, the user is making continuous inputs in which the current input is preceded by immediate historical inputs, or those inputs recognized at an earlier point in time by display panel 106 from when the user was tracing the same curve. Processor 108 may identify immediate historic input(s) based on a closeness in time and distance between the historic inputs and current inputs.

If processor 108 determines that there are immediate historic inputs, it may choose a first source for analysis (224). In choosing the first source for analysis, processor 108 may select one of a plurality of known sources from memory 112 based on various criteria. In accordance with one embodiment of the invention, processor 108 may select the first source for analysis based on which source provided the most recent input.

In one embodiment, processor 108 needs not identify the exact source and only need to recognize one source as being distinct from another. For example, processor 108 needs not identify that the two sources providing inputs consist of a pen-shaped stylus and a wireless video game controller; it only need to designate each as a distinct source, such as source 1 and source 2.

After the first source is selected for analysis, processor 108 may obtain, at step 226, current input data from display panel 106 and earlier input data associated with the first source from memory 112. In obtaining current input data, processor 108 may receive from display panel 106 or memory 112 data on inputs that are currently being analyzed, including their timing, location, and their vector properties. In obtaining previous input data, processor 108 may retrieve from memory 112 input data provided by the first source immediately preceding the input currently being analyzed.

Based on the previous input data and current input data, processor 108 may generate, at step 228, various previous vectors representing earlier paths of inputs from the first source as well as the current vector of the current input. In accordance with one embodiment of the invention, processor 108 computes a vector movement by determining the difference between the vectors computed based on three previous consecutive inputs and projects, based on the vector movement, a direction, movement, or both, of the current input. By determining a plurality of vectors based on consecutive inputs and vector movements, processor 108 projects an input trend which may be used to better identify the current user input and distinguish it from inputs from other users or from another source. An example of the projections and calculations of processor 108 will be described in detail in association with FIGS. 4 and 5.

At step 230, processor 108 analyzes the previous vectors to determine whether the vector movement of the ongoing trace, based on the previous vectors, has changed. If processor 108 concludes that there has been a change in the vector movement, then it calculates a projected vector in step 232 based on the amount of change vector movement and identifies, in step 234, those inputs originating from the selected source based on the projected vector. On the other hand, if processor 108 concludes that there are not been a change in the vector movement, then it bypasses step 232 and immediately identifies those inputs originating from the selected source (step 234).

A detailed explanation of the process illustrated in steps 228-232 will now be described in association with hypothetical inputs shown in FIGS. 4 and 5.

Figure 4:
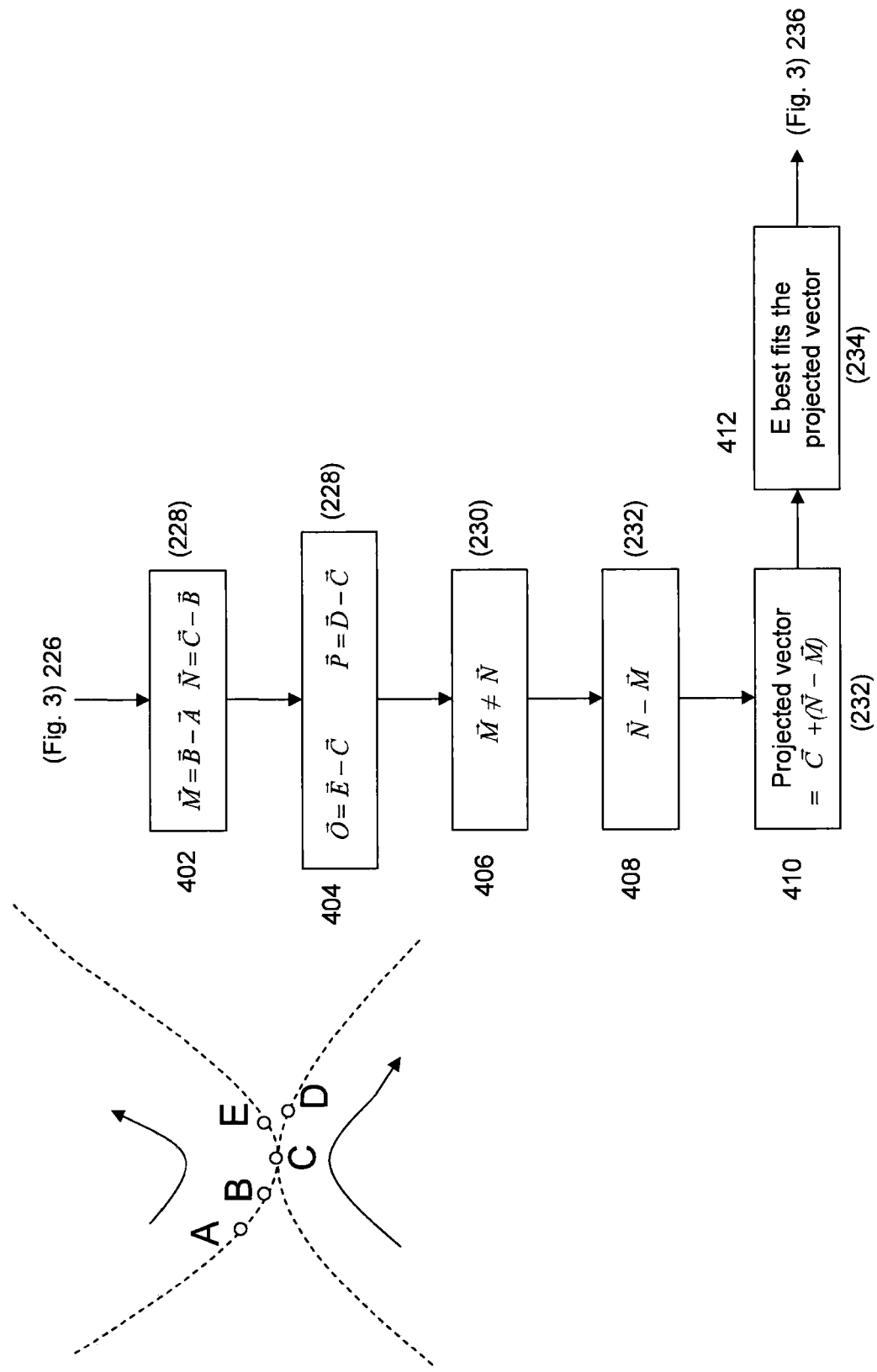
FIG. 4 shows an exemplary process of input analysis, consistent with certain disclosed embodiments.

FIG. 4 shows a hypothetical situation in which two traces, each being supplied as input by a different source, are simultaneously provided as inputs on display panel 106. The sketch in FIG. 4 represents a front view of inputs provided on display panel 106. The first trace is the top curve containing inputs A, B, C, and E, and the second trace is the bottom curve containing inputs C and D. Inputs in both traces are being provided from the left side to the right side of display panel 102. The two traces converge and meet at input C, and diverge at inputs E and D. In this example, inputs E and D are current inputs determined in step 206 to constitute simultaneous inputs and determined in step 208 to not have a varying parameter. The source selected in step 224 is providing inputs to the first trace. Accordingly, processor 108 determines, in steps 402-412, whether input E or D, or both inputs E and D, belongs to the top trace being supplied by the selected source.

In step 402, processor 108 generates previous vectors M and N using consecutive previous inputs A, B, and C. Vector M is the difference between A and B, and vector N is the difference between B and C. In step 404, processor 108 generates current vectors O and P using current inputs E and D, as well as input C, which immediately precedes both E and D in both traces. Vector O is the difference between C and E, and vector P is the difference between C and D. That is, processor 108 determines, in steps 402 and 404, previous and current vectors, as described in step 228 of FIG. 3.

Next, processor 108 determines whether the previous vectors has changed with respect to one another (steps 406 and 230). In accordance with one embodiment of the invention, processor 108 makes the determination by comparing vector N with vector M which immediate precedes vector N. In step 406, processor 108 concludes that because M and N are not equal, a change had occurred between vectors M and N. Thereafter, processor 108 determines the amount of change, or the vector movement, between previous vectors M and N by calculating the difference between the two vectors (step 408).

Based on the determination of vector movement from vectors M and N, processor 108 calculates a projected vector (steps 410 and 232) to predict where an input immediately following input C, or the most recent input used in determining the vectors M and N, should be located. In accordance with one embodiment of the invention, processor 108 calculates the projected vector by adding, to input C, the difference between vectors N and M. That is, the current vector is projected based on a change between previous vectors. Finally, in step 412, processor 108 selects the current input that best fits the projected vector (step 234). In one embodiment, because the difference between the projected path and E is smaller than the difference between the projected path and D, input E may be selected.

In another embodiment accordingly to the present invention, once processor 108 identifies the source of a first input, it may determine, based on a trace representing the vector movement computed from a vector generated from the first current input and an input immediately preceding the first current input, whether a second current input originated from the same source as the first current input. For example, in FIG. 4, once processor 108 determines that input E originated from the selected source, processor 108 may compute a first trace based on vector O, which is generated from E, a first current input, and C, which immediately precedes E. Processor 108 may then determine, based on O, whether a second current input D originated from the same source as E. Also, if processor 108 determines that the second current input does not originate from the same source as the first current input, it may compute a second trace based on previous inputs originating from a second source, different than the first source, to determine if the second input is a portion of a second trace originating from the second source. For example, in FIG. 4, if processor 108 determines that D does not originate from the same source as E, it may generate a second trace, or the bottom trace in the sketch, including a vector based on previous inputs contained within the bottom trace, e.g., C and another point (not shown), and determine whether E is a portion of the bottom trace of inputs.

Figure 5:
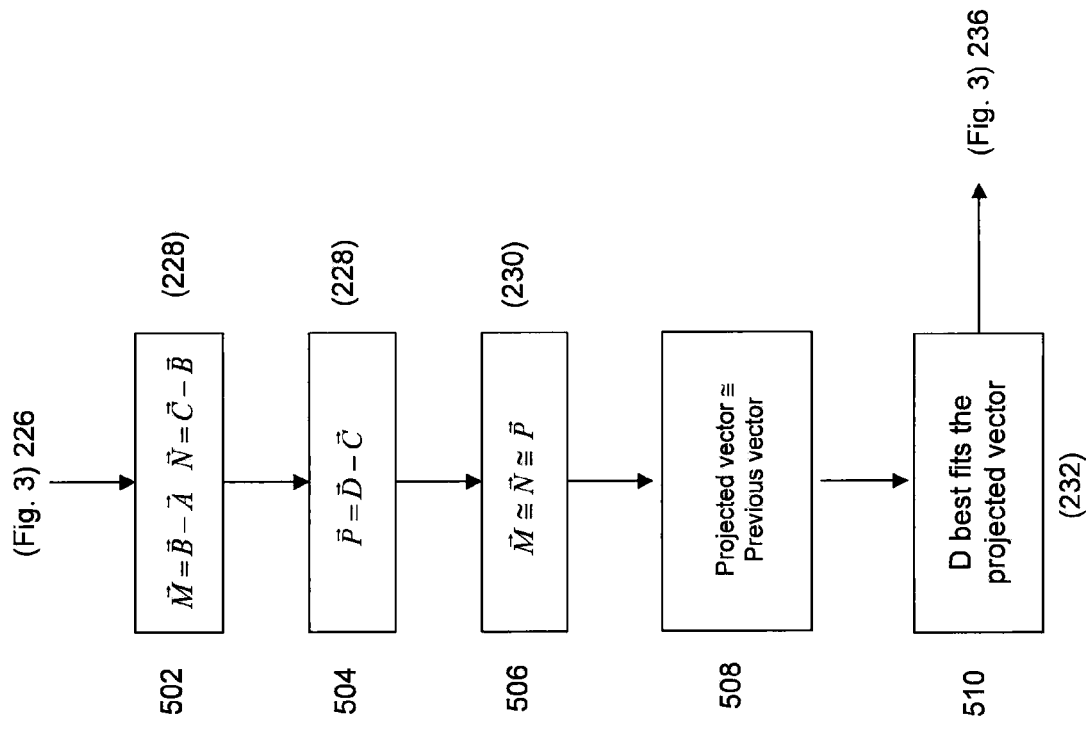
FIG. 5 shows an exemplary process of input analysis, consistent with certain disclosed embodiments.
Figure 5:
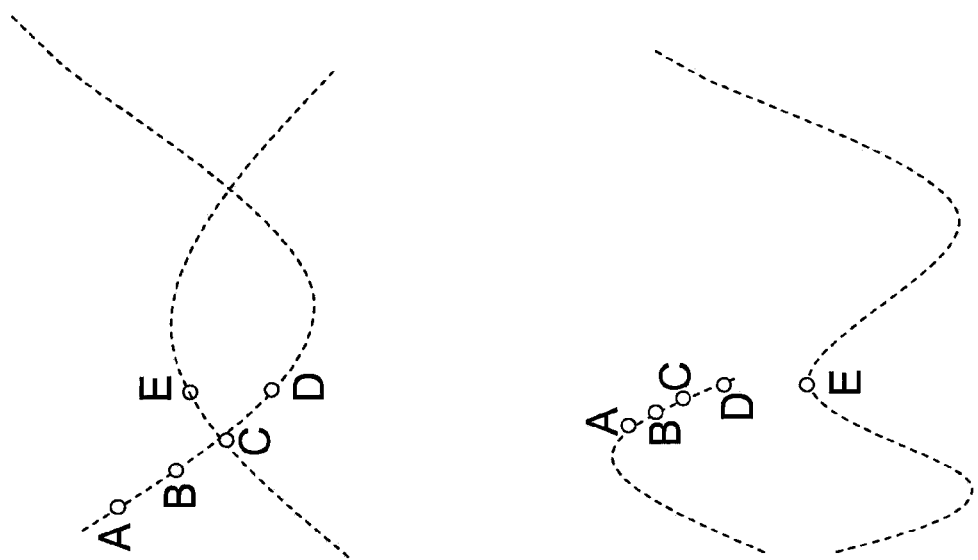

FIG. 5 shows two different hypothetical situation in which two traces, each being supplied as input by a different source, are simultaneously provided as inputs on display panel 106. The top sketch and the bottom sketch in FIG. 5 each represents a front view of inputs provided on display panel 106. Similar to the sketch in FIG. 4, the traces in both sketches in FIG. 5 are being provided from the left side to the right side of display panel 102. The top sketch represents a hypothetical situations in which a top trace, containing inputs A, B, C, and D, comes into contact and crosses over a bottom trace that also contains input C. The previous inputs are A, B, and C, and the current input is D. The bottom sketch represents a different hypothetical situation in which a top trace, containing inputs A, B, C, and D, does not cross over a bottom trace, containing input E. The previous inputs are A, B, and C, and the current inputs are D and E. In both sketches, the source selected in step 224 is providing inputs to the top trace. Accordingly, in steps 502-508, processor 108 determines whether input E or D, or both inputs E and D, belongs to the top trace being supplied by the selected source.

In accordance with one embodiment of the invention, processor 108 engages in the same steps of analysis for these two situations. In step 502, processor 108 generates previous vectors M and N based on consecutive previous inputs A, B, and C. Vector M is the difference between A and B, and vector N is the difference between B and C.

In step 504, processor 108 determines the current vector P by calculating the difference between inputs D and C. In one embodiment, the calculation of E–C is omitted because it is significantly different from vector M and N. In step 506, processor 108 determines that previous vectors M and N are substantially equal or close to each other and concludes that there is little or no change in the vector movement based on previous vectors M and N. Processor 108 also determines, in step 506, that vector P, representing the vector of current input D, is substantially equal or close to previous vectors M and N. In step 508, processor 108 determines that little or no change has occurred between the previous vectors M and N and, accordingly, the projected vector in each of the sketches will be substantially equal or close to the previous vector. Based on this projected vector, processor 108 concludes that in each of the sketches, current input D, and not current input E, belongs to the top trace supplied by the selected source (step 510), because current input D is substantially equal or close to previous vectors M and N.

Back in FIG. 3, after processor 108 identifies all inputs that originated from the selected source (step 234), it determines whether there are any current inputs have not been identified with a source (step 236). For example, in FIG. 5, current input D would be an indentified input that originated from the selected source, and input E would be considered as a current input that has not been identified with a source. When there is at least one non-identified current input remaining, processor 108 selects a second source, different than the source for which processor 108 had just obtained previous data for, to use in analysis (step 238).

Once the second source is selected, processor 108 repeats steps 226-236 to determine whether the remaining current inputs, determined not to belong to part of the trace provided by the first source, in fact belong to part of a trace provided by the second source. That is, processor 108 obtains previous input data associated with the second source (step 226), generates previous vectors associated with the second source (step 228), determines if there is a change in previous vectors from the second source (step 230), and identifies those inputs originating from second source (step 234). Processor 108 may repeat steps 226-238 until all sources to which memory 112 contains immediate historic inputs have been analyzed and correlated with current inputs, or until all current inputs have been identified, whichever occurs first.

On the other hand, if processor 108 determines, in step 222, that memory 112 does not hold any immediate historic inputs, then it treats all current inputs as either originating from one source or originating from different sources, based on the application. For example, if display panel 106 resembles a target used in a one-person shooting game, processor 108 may treat all inputs as coming from one source. As another example, if display panel 106 acts as an interactive drawing board in which multiple users are beginning to inputs traces at the same time, processor 108 may treat all inputs as originating from different sources. In the latter example, however, once the initial inputs provided have been analyzed, later inputs belonging to the same traces will undergo analysis described in steps 224-238 because processor 108 will deem the first inputs as immediate historic inputs for those later inputs.

Back in FIG. 2, once all inputs that are considered to be simultaneous inputs (206), including those with and without a varying parameter (steps 208, 210, 220), have been analyzed, processor 108 then determines whether there are any current inputs that do not fall within the first predetermined time constraint, but nevertheless fall within a second predetermined time constraint. The second predetermined time constraint is a period of time lasting a fraction of a second that is longer than first predetermined time constraint. Multiple inputs received within the second predetermined time constraint are deemed to be part of a continuous trace. In one embodiment in accordance with the present invention, the second predetermined time constraint is similar to the constraint used in determining immediate historic inputs in FIG. 3, and is determined based on a closeness in time and distance between the current inputs.

Also, when multiple inputs provided to display panel 106 are not simultaneous inputs, they may nevertheless be inputs that belong to a continuous trace. Accordingly, in step 212, processor 108 also analyzes all inputs that do not fall within the first predetermined time constraint (step 206) to determine if they fall within the second predetermined time constraint.

In step 212, when processor 108 determines that there are inputs that fall within the second predetermined time constraint, it selects those inputs to be the current inputs for analysis (step 218). Then, processor 108 repeats the analysis described in steps 206, 208, 210, and 220 on these newly selected current inputs that presumably belong to part of a trace. Processor 108 repeats steps 206, 208, 210, and 220 until all current inputs are considered and there are current inputs remaining that do not fall within either the first or the second predetermined time constraint, i.e., there are current inputs that are neither simultaneous nor continuous. Then, processor 108 treats those remaining current inputs as either originating from one source or originating from different sources, based on the application, similar to the analysis described in association with step 240 in FIG. 3.

Once processor 108 identifies current inputs with their respective sources, controller 110 is able to perform a variety of tasks using this information. For example, controller 110 may instruct display panel 106 to respond to those inputs originating from the same source by displaying a first graphic in the location of those inputs, and respond to those inputs originating from a different source by displaying a second graphic, different than the first graphic, in the location of those inputs. As another example, when two identified sources providing inputs are controllers, controller 110 may instruct one of those controllers to vibrate upon detection and identification of inputs originating from that controller. Controller 110 may also cause panel module 102, host 116, or device 118 to output different sounds corresponding to the one or multiple sources of input.

The foregoing description has been presented for purposes of illustration. It is not exhaustive and does not limit the invention to the precise forms or embodiments disclosed. Modifications and adaptations of the invention will be apparent to those of ordinary skill in the art from consideration of the specification and practice of the disclosed embodiments of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for identifying multiple optical inputs to a display area with embedded photo sensors, the method comprising:
   providing a display area with embedded photo sensors configured to display visual information;
   receiving a first input optically transmitted to a first location on the display area;
   receiving a second input optically transmitted to a second location on the display area;
   processing the first and second inputs to identify a timing of the first and second inputs; and
   determining whether the first and second inputs originated from a single source or multiple sources based on at least one estimated trace of at least one of the first and second inputs; and
   providing first input information and second input information each containing at least one of (1) the location of the respective input relative to the display area; and (2) the timing of the respective input,
   wherein determining whether the first and second inputs originated from a single source or multiple sources based on at least one estimated trace comprises:
      determining a first source from which the first input originated;
      receiving a first plurality of historical inputs from the first source, wherein the historical inputs precede the first input in time;
      computing a first trace of inputs based on the first input and at least one of the first plurality of historical inputs; and
      determining, based on the first trace of inputs, whether the second input originated from the first source.

2. The method of claim 1, wherein the display area is a part of a portable digital assistant (PDA), a gaming console, a cell phone, a digital photo frame, a camera, a computer system, a laptop computer, an automatic teller machine (ATM), or a display monitor.

3. The method of claim 2, further comprising determining whether the first and second inputs originated from a single source or multiple sources based on at least one of (1) the wavelengths of the first and second inputs; (2) the flash or pulse frequencies of the first and second inputs; (3) the durations of the first and second inputs; (4) the timings of the first and second inputs; (5) the intensities of the first and second inputs; (6) the modulation schemes associated with the first and second inputs; and (7) projected input patterns of the first and second inputs.

4. The method of claim 1, wherein the each of the first and second inputs comprises at least one of infrared, laser, invisible light, and visible light.

5. The method of claim 1, further comprising:
   computing a second trace of inputs based on at least two of a plurality of historical inputs from a second source, and
   determining, based on the first trace of inputs and the second trace of inputs, whether the second input is a portion of the second trace of inputs.

6. The method of claim 5, wherein determining whether the second input is a portion of the first trace of inputs comprises observing at least one of (1) movements of consecutive inputs from a first user, (2) directions of movements of the consecutive inputs from a first user, and (3) a projected location of an input that is a portion of the first trace of inputs based on the first input and at least one of the plurality of historical inputs.

7. The method of claim 1, wherein determining whether the first and second inputs originated from a single source or multiple sources based on the at least one estimated trace comprises:
   receiving a second plurality of historical inputs from a second source, wherein the second plurality of historical inputs precede the first input in time;
   computing a second trace of inputs based on the second plurality of historical inputs; and
   determining, based on the second trace of inputs, whether the first or second input originated from the first source.

8. The method of claim 7, wherein computing the second trace of inputs includes calculating a projected trace and determining whether the first or second input originated from the second source includes comparing the first and second inputs with the projected trace.

9. The method of claim 7, wherein computing the second trace of inputs includes identifying at least two vectors based on at least two of the second plurality of historical inputs and the first input and determining a difference between the at least two vectors.

10. The method as in claim 1 further comprising displaying the visual information on the display area in response to at least one of the first input information and the second input information.

11. The method as in claim 1, wherein determining whether the first and second inputs came from a single user or multiple users comprises distinguishing the first input from the second input based on at least one of (1) the wavelengths of light beams from the first and second inputs; (2) the flashing or pulse frequencies of the light beams from the first and second inputs; (3) the elapsed times of the light beams from the first and second inputs; (4) the timings of the first and second inputs; (5) the intensities of the light beams from the first and second inputs; and (6) the modulated signals associated with the first and second inputs.

12. The method as in claim 1, wherein providing the signals identifying the first input information and the second input information comprises identifying at least the location of the first input and the location of the second input.

13. The method as in claim 1, wherein receiving the first and second inputs comprises sensing the first and second inputs using a display system including the display area.

14. The method as in claim 1, wherein software instructions executable by a computer system are used to perform at least a portion of the method.

15. A system for identifying multiple optical inputs to a display area with embedded photo sensors, the system comprising:
a display area with embedded photo sensors configured to display visual information; an input-detection unit for receiving a first and a second input optically transmitted to a first and a second location, respectively, on the display area; and
a processor, wherein the processor:
identifies a timing of the first and second inputs;
determines whether the first and second inputs originated from a single source or multiple sources based on at least one estimated trace of at least one of the first and second inputs; and
provides first input information and second input information each containing at least one of (1) the location of the respective input relative to the display area; and (2) the timing of the respective input,
wherein determining whether the first and second inputs originated from a single source or multiple sources based on at least one estimated trace comprises:
determining a first source from which the first input originated;
receiving a plurality of historical inputs from the first source, wherein the historical inputs precede the first input in time;
computing a first trace of inputs based on the first input and at least one of the plurality of historical inputs; and
determining, based on the first trace of inputs, whether the second input originated from the first source.

16. The system of claim 15, wherein the display area is a part of a portable digital assistant (PDA), a gaming console, a cell phone, a digital photo frame, a camera, a computer system, a laptop computer, an automatic teller machine (ATM), or a display monitor.

17. The system of claim 16, wherein the processor further determines whether the first and second inputs originated from a single source or multiple sources based on at least one of (1) the wavelengths of the first and second inputs; (2) the flash or pulse frequencies of the first and second inputs; (3) the durations of the first and second inputs; (4) the timings of the first and second inputs; (5) the intensities of the first and second inputs; (6) the modulation schemes associated with the first and second inputs; and (7) projected input patterns of the first and second inputs.

18. The system of claim 15, wherein the each of the first and second inputs comprises at least one of infrared light, laser, invisible light, and visible light.

19. The system of claim 15, wherein the processor further computes a second trace of inputs based on at least two of a plurality of historical inputs from a second source, and determines, based on the first trace of inputs and the second trace of inputs, whether the second input is a portion of the second trace of inputs.

20. The system of claim 19, wherein determining whether the second input is a portion of the first trace of inputs comprises observing at least one of (1) movements of consecutive inputs from a first user, (2) directions of movements of the consecutive inputs from a first user, and (3) a projected location of an input that is a portion of the first trace of inputs based on the first input and at least one of the plurality of historical inputs.

21. The system of claim 15, wherein determining whether the first and second inputs originated from a single source or multiple sources based on the at least one estimated trace comprises:
receiving a second plurality of historical inputs from a second source, wherein the second plurality of historical inputs precede the first input in time;
computing a second trace of inputs based on the second plurality of historical inputs; and
determining, based on the second trace of inputs, whether the first or second input originated from the first source.

22. The system of claim 21, wherein computing the second trace of inputs includes calculating a projected trace and determining whether the first or second input originated from the first source includes comparing the first and second inputs with the projected trace.

23. The system of claim 21, wherein computing the second trace of inputs includes identifying at least two vectors based on at least two of the second plurality of historical inputs and the first input and determining a difference between the at least two vectors.

24. The system of claim 15, wherein the display area displays visual information in response to at least one of the first input information and the second input information.

25. The system of claim 15, wherein the processor distinguishes the first input from the second input based on at least one of (1) the wavelengths of light beams from the first and second inputs; (2) the flashing or pulse frequencies of the light beams from the first and second inputs; (3) the elapsed times of the light beams from the first and second inputs; (4) the timings of the first and second inputs; (5) the intensities of the light beams from the first and second inputs; and (6) the modulated signals associated with the first and second inputs.

26. The system of claim 15, wherein the processor identifies at least the location of the first input and the location of the second input.

27. The system of claim 15, further comprising a display system which incorporates the display area and the input-detection unit.

\* \* \* \* \*